United States Patent
Xu

(10) Patent No.: US 8,437,143 B2
(45) Date of Patent: May 7, 2013

(54) ELECTRONIC DEVICE WITH ROTATABLE KEYPAD

(75) Inventor: Zhong Xu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 230 days.

(21) Appl. No.: 12/862,722

(22) Filed: Aug. 24, 2010

(65) Prior Publication Data

US 2011/0242784 A1    Oct. 6, 2011

(30) Foreign Application Priority Data

Mar. 31, 2010    (CN) .......................... 2010 1 0137663

(51) Int. Cl.
*H05K 7/02* (2006.01)
*H05K 7/06* (2006.01)
*H05K 7/08* (2006.01)
*H05K 7/10* (2006.01)

(52) U.S. Cl.
USPC ............ 361/782; 361/763; 361/783; 361/784

(58) Field of Classification Search .......... 361/782–784, 361/760–763, 807–810; 345/153–173
See application file for complete search history.

(56) References Cited

U.S. PATENT DOCUMENTS

| | | | | |
|---|---|---|---|---|
| 6,774,887 | B2 * | 8/2004 | Lu .................................. | 345/161 |
| 2003/0044000 | A1 * | 3/2003 | Kfoury et al. ............ | 379/433.04 |
| 2007/0247421 | A1 * | 10/2007 | Orsley et al. .................. | 345/156 |
| 2007/0291016 | A1 * | 12/2007 | Philipp ......................... | 345/174 |
| 2008/0088600 | A1 * | 4/2008 | Prest et al. .................... | 345/173 |
| 2008/0284742 | A1 * | 11/2008 | Prest et al. .................... | 345/173 |
| 2009/0058802 | A1 * | 3/2009 | Orsley .......................... | 345/157 |
| 2009/0229892 | A1 * | 9/2009 | Fisher et al. ................ | 178/18.03 |

* cited by examiner

*Primary Examiner* — Tuan T Dinh
(74) *Attorney, Agent, or Firm* — Altis Law Group, Inc.

(57) ABSTRACT

A method for controlling an electronic device is provided. The electronic device includes a housing, a keypad, a first conductive surface, and a second conductive surface. The keypad is rotatable and includes buttons. The first conductive surface is attached to the bottom of the keypad, rotatable with the keypad, and includes first contact portions. The second conductive surface is fixed in the housing, arranged below the first conductive surface, spaced apart from the first conductive surface, and includes second contact portions. The method includes determining which of the buttons is pressed. Determining whether an activation signal is received, wherein when the first contact portion contacts one of the second contact portions which shape is the same as the first contact portion, the activation signal is generated. Determining the pressed button is activated if the activation signal is received, and executing a function corresponding to the activated button.

8 Claims, 5 Drawing Sheets

ELECTRONIC DEVICE WITH ROTATABLE KEYPAD

BACKGROUND

1. Technical Field

The present disclosure relates to electronic devices and methods thereof and, particularly, to an electronic device having a rotatable keypad and a method for controlling the electronic device.

2. Description of Related Art

Usually, mechanical buttons of electronic devices, for example, buttons of mobile phones, can be actuated by a press, which may result in accidental activation or deactivation. For example, if a dial button of a mobile phone is pressed by accident, an unwanted phone call may be placed, which may bring trouble to communication parties of the unwanted phone call.

BRIEF DESCRIPTION OF THE DRAWINGS

The components of the drawings are not necessarily drawn to scale, the emphasis instead being placed upon clearly illustrating the principles of an electronic device with a rotatable keypad and method for controlling the electronic device. Moreover, in the drawings, like reference numerals designate corresponding parts throughout several views.

DETAILED DESCRIPTION

Figure 1:
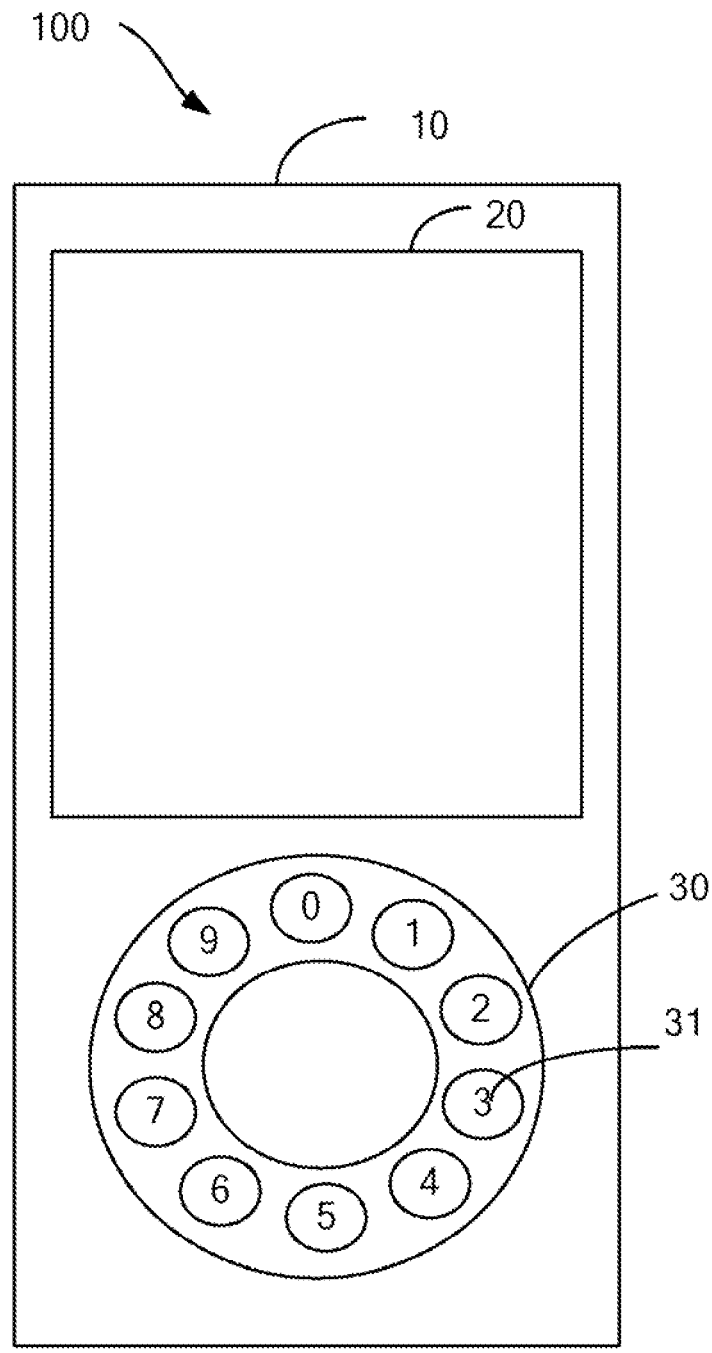
FIG. 1 is a schematic view of an electronic device with a rotatable keypad in accordance with an exemplary embodiment.

Referring to FIG. 1, an electronic device 100 in accordance with an exemplary embodiment is shown. The electronic device 100 may be a mobile phone, a PDA, or the like. The electronic device 100 includes a housing 10, a display 20, and a rotatable keypad 30. The display 20 and the keypad 30 are received in the housing 10. The display 20 is configured to display visual information. The keypad 30 can be rotated clockwise or counterclockwise when an external force is exerted on, and can return to its original state when the keypad 30 is released. In this embodiment, the keypad 30 is substantially annular.

The keypad 30 includes a plurality of buttons 31. In this embodiment, ten numerical buttons 31 from 0 to 9 are shown. The buttons 31 can vary according to need.

Figure 2:
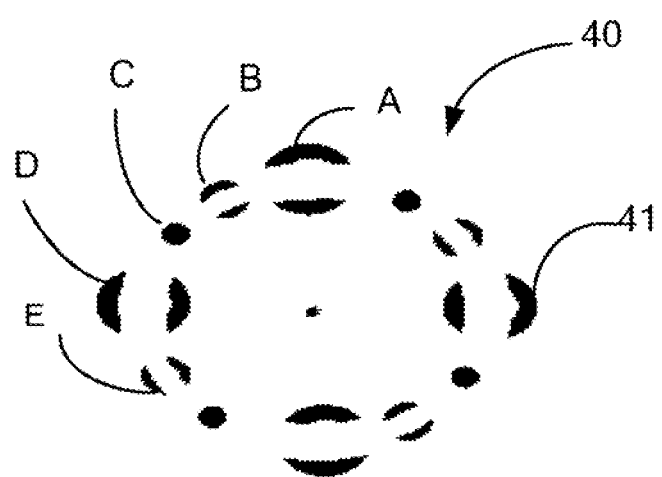
FIG. 2 is a schematic view of a first conductive surface of the electronic device of FIG. 1.
Figure 3:
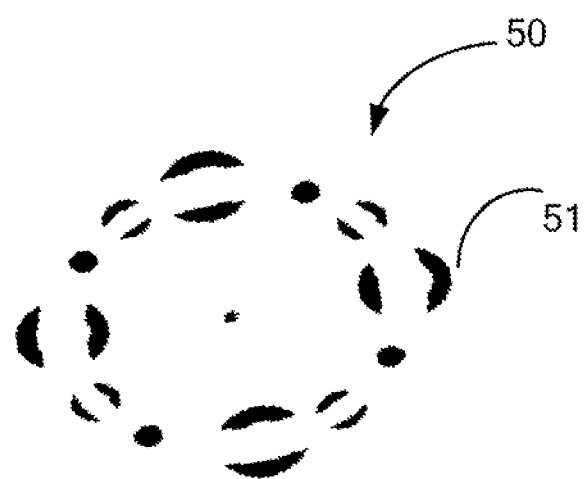
FIG. 3 is a schematic view of a second conductive surface of the electronic device of FIG. 1.

The electronic device 100 further includes a first conductive surface 40 (see FIG. 2) and a second conductive surface 50 (see FIG. 3). The first conductive surface 40 is attached to the bottom of the keypad 30 and can rotate with the keypad 30. The second conductive surface 50 is fixed in the housing 10 and arranged below the first conductive surface 40. The first conductive surface 40 is spaced apart from the second conductive surface 50.

The first conductive surface 40 includes a plurality of contact portions 41. The number of the contact portions 41 is the same as that of the buttons 31. Each contact portion 41 corresponds to one button 31. Adjacent contact portions 41 are different from each other, and the spaced (non-adjacent) contact portions 41 may be the same. As shown in FIG. 2, the shape of the contact portion A is different from that of the contact portion B, the shape of the contact portion B is different from that of the contact portion C, the shape of the contact portion C is different from that of the contact portion D, the shape of the contact portion A is the same as that of the contact portion D, and the shape of the contact portion B is the same as that of the contact portion E. The structure of the second conductive surface 50 is the same as the first conductive surface 40 (see FIG. 3). The second conductive surface 50 includes a plurality of contact portions 51. Each contact portion 51 is arranged below one contact portion 41. The adjacent contact portions 51 are different from each other, and the spaced (non-adjacent) contact portions 51 may be the same. In an initial position, the shape of each contact portion 41 is different from that of the contact portion 51 below the contact portion 41. In the embodiment, contact portions are made of conductive material.

Figure 4:
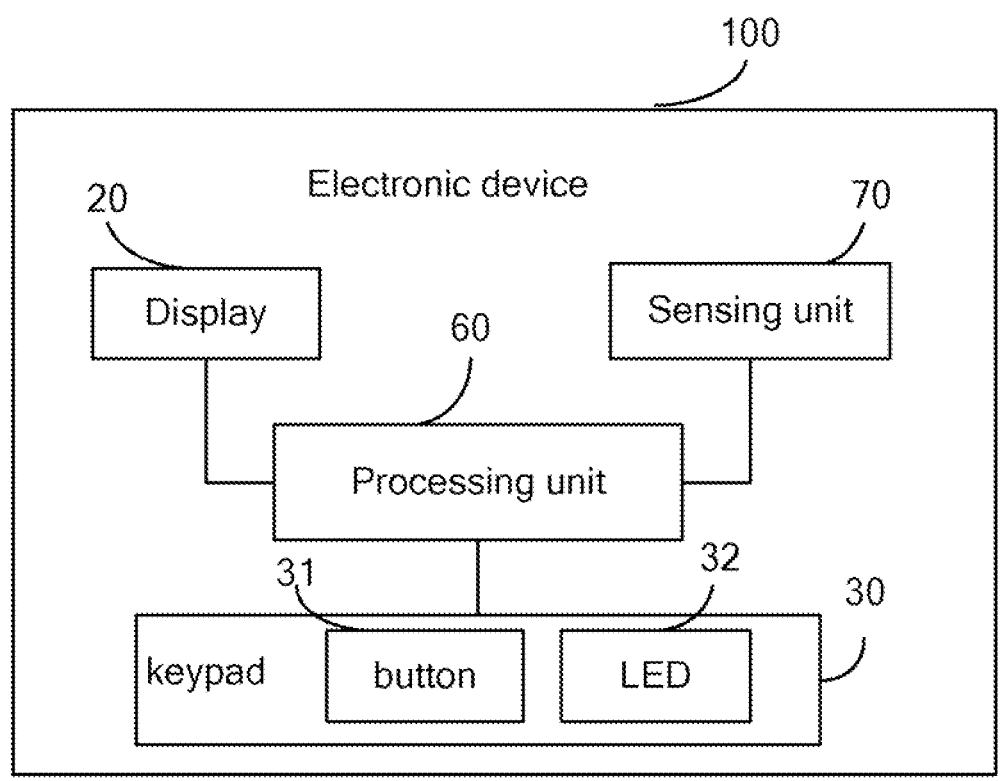
FIG. 4 is a block diagram of the electronic device of FIG. 1.

Referring to FIG. 4, the electronic device 100 further includes a processing unit 60 and a sensing unit 70. The sensing unit 70 is configured to generate an activation signal when the contact portion 41 corresponding to one pressed button 31 contacts the contact portion 51 whose shape is the same as the contact portion 41. The processing unit 60 is configured to determine which button 31 is pressed, and determine that one pressed button 31 is activated upon receiving the activation signal. The processing unit 60 is further configured to execute a function corresponding to one activated button 31.

In this embodiment, as the shape of each contact portion 41 is different from the contact portion 51 below the contact portion 41, when one button 31 is pressed, the keypad 30 can be rotated clockwise or counterclockwise to cause the contact portion 41 corresponding to the pressed button 31 to contact one contact portion 51 whose shape is the same as the contact portion 41. With such configuration, pressing one button 31 without rotating the keypad 30 cannot activate the button 31, thus avoiding accidental activation of the button 31.

In this embodiment, each button 31 is transparent. A light-emitting diode (LED) 32 is arranged in each button 31. The color of the light emitted by the LEDs 32 is different from each other. When any button 31 is pressed, the processing unit 60 lights the LEDs 32. As the color of the light emitted by the LEDs 32 is different from each other, therefore, during the rotation of the keypad 30, the color change of the light is presented to provide esthetic enjoyment to users.

Figure 5:
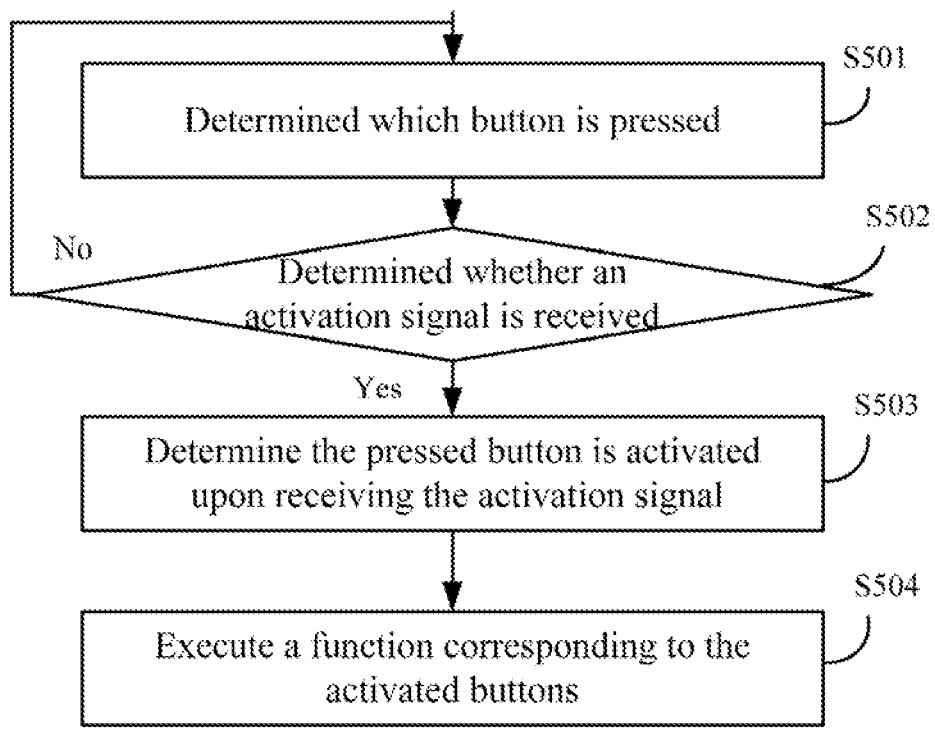
FIG. 5 is a flowchart of a method for controlling the electronic device of FIG. 1 in accordance with an exemplary embodiment.

Referring to FIG. 5, a flowchart of a method for controlling the electronic device 100 in accordance with an exemplary embodiment is shown.

In step S501, the processing unit 60 determines which button 31 is pressed.

In step S502, the processing unit 60 determines whether an activation signal is received. In this embodiment, the sensing unit 70 generates the activation signal when the contact portion 41 corresponding to one pressed button 31 contacts the contact portion 51 whose shape is the same as the contact portion 41. If yes, the procedure goes to S503, otherwise, the procedure returns to S501.

In step S503, the processing unit 60 determines the pressed button is activated upon receiving the activation signal.

In step S504, the processing unit 60 executes a function corresponding to the activated buttons 31.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. An electronic device, comprising:
   a housing;
   a keypad received in the housing and comprising a plurality of buttons, the keypad rotating when an external force is exerted thereon and returning to the keyboard's original state when the keypad is released;
   a first conductive surface attached to the bottom of the keypad and rotatable with the keypad, the first conductive surface comprising a plurality of first contact portions, the adjacent contact portions being different from each other;
   a second conductive surface fixed in the housing and arranged below the first conductive surface, the second conductive surface being spaced apart from the first conductive surface, a structure of the second conductive surface being the same as the first conductive surface, the second conductive surface comprising a plurality of second contact portions, the shape of each of the second contact portions being different from one of the first contact portions above the each of the second contact portions in an initial state;
   a sensing unit configured to generate an activation signal when one of the first contact portions contacts one of the second contact portions whose shape is the same as the one of the first contact portions; and
   a processing unit configured to determine which button is pressed, determine that one pressed button is activated upon receiving the activation signal, and execute a function corresponding to the activated button.

2. The electronic device as described in claim 1, wherein the keypad is substantial annular.

3. The electronic device as described in claim 1, wherein a light-emitting diode (LED) is arranged in each of the buttons, each of the buttons is transparent, the processing unit is further configured to light the LEDs when one of the buttons is pressed.

4. An electronic device, comprising:
   a housing;
   a keypad received in the housing comprising a plurality of buttons, the keypad rotating when an external force is exerted thereon;
   a first conductive surface attached to the bottom of the keypad, the first conductive surface comprising a plurality of first contact portions;
   a second conductive surface fixed in the housing, arranged below the first conductive surface, and spaced apart from the first conductive surface, the second conductive surface comprising a plurality of second contact portions;
   a sensing unit configured to generate an activation signal when one of the first contact portions contacts one of the second contact portions whose shape is the same as the one of the first contact portions corresponding to the pressed button; and
   a processing unit configured to determine which button is pressed, determine that a button is activated upon the receiving activation signal, and execute a function of an activation button
   wherein the structure of the first conductive surface is the same as that of the second conductive surface, the adjacent first contact portions are different from each other, and the adjacent second contact portions are different from each other.

5. The electronic device as described in claim 4, wherein the keypad returns to the keyboard's original state when the keypad is released.

6. The electronic device as described in claim 4, wherein the shape of one of the first contact portions is different from that of one of the second contact portions below the each of the first contact portions in an initial state.

7. The electronic device as described in claim 4, wherein the keypad is substantial annular.

8. The electronic device as described in claim 4, wherein a light-emitting diode (LED) is arranged in each of the buttons, each of the buttons is transparent, the processing unit is further configured to light the LEDs when one of the buttons is pressed.

* * * * *